United States Patent [19]

Foster

[11] Patent Number: 4,725,216

[45] Date of Patent: Feb. 16, 1988

[54] MASONRY MANUFACTURE

[75] Inventor: Gary J. Foster, Collaroy, Australia

[73] Assignee: Bergood Pty. Limited, New South Wales, Australia

[21] Appl. No.: 837,253

[22] Filed: Mar. 7, 1986

[30] Foreign Application Priority Data

Mar. 15, 1985 [AU] Australia .............................. PG9745

[51] Int. Cl.⁴ .............................................. A01J 17/00

[52] U.S. Cl. ...................................... 425/200; 425/62; 425/219; 425/350; 425/351; 425/361; 366/65; 366/293

[58] Field of Search ..................... 425/62, 219, 348 R, 425/200, 204, 350, 351, 358, 361; 366/65, 293

[56] References Cited

U.S. PATENT DOCUMENTS

| | | | |
|---|---|---|---|
| 264,398 | 9/1882 | Wright | 425/200 |
| 686,370 | 11/1901 | Volkersen | 425/350 |
| 881,815 | 3/1908 | Merritt | 425/350 |
| 1,096,905 | 5/1914 | Griffith | 425/219 |
| 3,688,814 | 9/1972 | Budai et al. | 425/219 |
| 4,557,681 | 12/1985 | Wright et al. | 425/62 |

*Primary Examiner*—Bernard Nozick
*Attorney, Agent, or Firm*—Birch, Stewart, Kolasch, & Birch

[57] ABSTRACT

A machine for making bricks and paving blocks, including a turntable having four moulds; a drive unit for rotating the turntable between work stations; a mixing chamber for raw materials; a hopper to receive mixed raw materials and to deliver them to each mould in turn; a hydraulic press to compress materials in a filled mould; and a ram for ejecting the resulting masonry product from the mould.

16 Claims, 5 Drawing Figures

MASONRY MANUFACTURE

BACKGROUND OF THE INVENTION

This invention relates to masonry and more particularly to a machine for the manufacture of cement stabilized pressed earth masonry products such as bricks, blocks and tiles.

Masonry products have, of course, been used since the beginning of recorded time. The manufacture of such products has developed principally along three lines; firstly the quarrying of stone; secondly using a process in which clay is moulded and then burnt by firing; and thirdly, the mixing of sand, cement and gravel to produce a concrete block.

To a somewhat lesser extent, "rammed" earth has long been used to produce bricks and monolithic structures, known as "adobe" and "pisé" respectively, the earth usually being taken from the immediate vicinity.

It will be appreciated that to achieve a serviceable product from the burnt clay process, suitable clays are required. However these often are not readily obtainable. This material must be prepared and moulded, using very expensive equipment, prior to drying the moulded product and subsequently firing it in a kiln. The process is quite a complex and costly one, and requires not only expensive machinery and considerable expenditure of energy, but also a large area of land for the manufacturing plant.

Similarly, the raw materials of concrete blocks, namely sand, gravel and cement, can be quite expensive and require transportation to the site. The raw product cannot be stacked during curing and hence, once again, a large factory area is required. Moreover, concrete blocks are highly permeable and cannot be used without an external sealing coat.

Adobe and pisé have self-evident inherent problems, particularly relating to structural strength and longevity.

SUMMARY OF THE INVENTION

It is an object of the present invention to overcome the above and other disadvantages of brick—and concrete block—making processes by the production of cement stabilized pressed earth masonry products.

In accordance with one aspect of the present invention, therefore, there is provided a machine for the manufacture of masonry products, this machine comprising, in combination, a turntable having therein two or more moulds; means for rotating the turntable between work stations; a mixing chamber for raw material; a hopper adapted to receive mixed raw materials from the mixing chamber and to deliver the materials to said moulds; a hydraulic press to compress the materials in a filled mould to form a masonry product; and means for ejecting the masonry product from the mould.

Preferably the turntable is provided with four such moulds equidistantly spaced thereabout, the turntable being rotatable through 90° in each operating cycle so that each mould is, in turn, presented to a filling station, a holding station, a compressing station and ejecting station.

A discharge aperture in the floor of the hopper may be positioned above the turntable so that each mould is, in sequence, placed in register with the discharge aperture.

Ideally, the mixing chamber may be disposed above the hopper, a gate in the floor of the chamber being manually operable for discharge of mixed raw materials into the hopper.

Preferably, the hopper is provided with a scraper blade the purpose of which is to level the surface of a filled mould prior to rotation of the turntable to the compressing station, this scraper blade being mounted on a rotatable central shaft.

Advantageously, each mould may be evacuated by movement of its lower surface in an upward direction to thereby eject the moulded masonry product for subsequent manual removable.

Rotation of the turntable, dispensing of mixed materials into a said mould, operation of the hydraulic press and the ejection of moulded masonry products may well be controlled and carried out automatically.

In a second aspect of the present invention, a method of manufacturing masonry products comprises the steps of: loading a predetermined mix of raw materials into the mixing chamber of the above noted machine; mixing the materials to a homogeneous state; transferring the materials into the hopper of the machine; delivering the materials into the moulds of the machine; compressing the materials in the filled moulds, by operation of the machine's hydraulic press, to form a masonry product; ejecting the formed masonry products by operation by the machine ejecting means; storing the products for a period of three days in cool, damp conditions; and drying the masonry products in the open air.

Preferably, the drying step may consist in exposing the masonry products to sunlight for a period of up to four days.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 3:
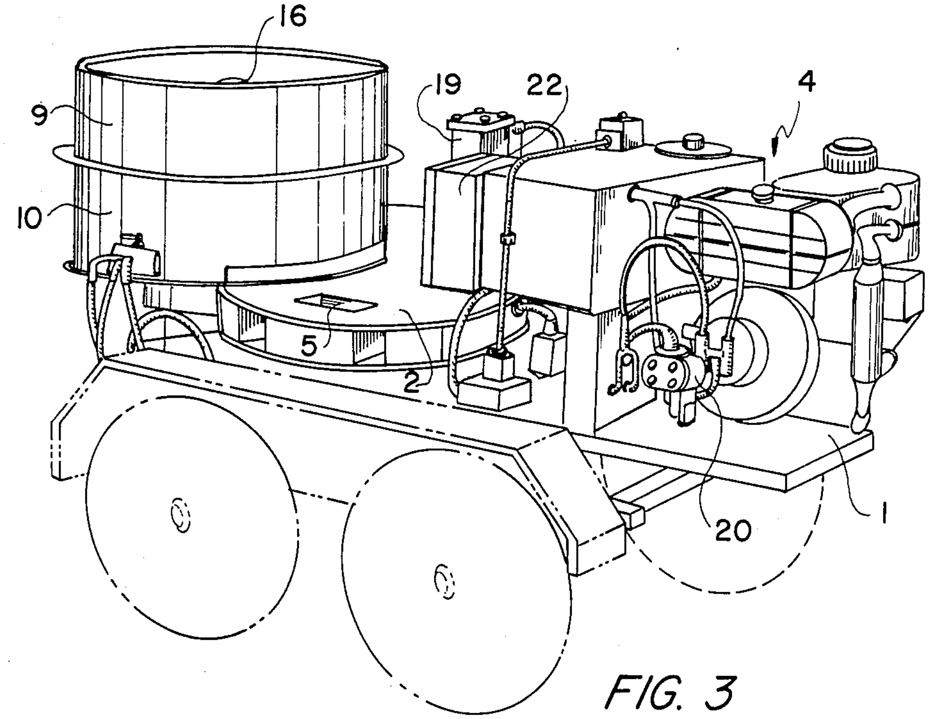
FIG. 3 is a perspective view of the embodiment mounted on a four wheeled vehicle.

The machine of the present invention may be freestanding, mounted upon a suitable truck, or mounted upon a conventional trailer as shown in FIG. 3.

The motive power may be either an internal combustion engine, preferably a 25 HP diesel, or for example a 415-volt electric motor.

Figure 1:
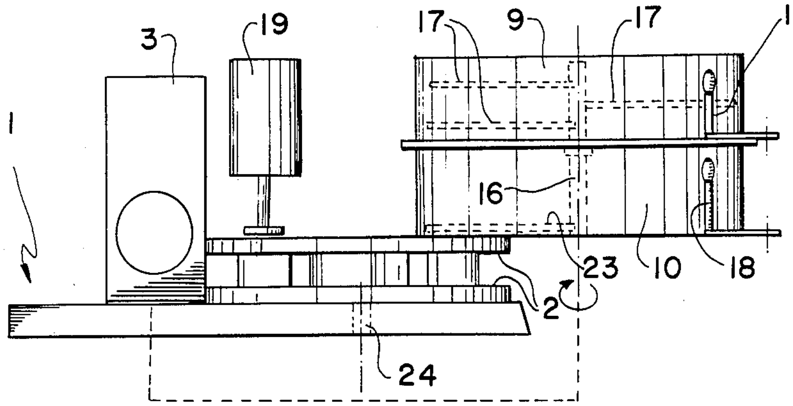
FIG. 1 is a schematic side view of the machine according to the present invention.
Figure 2:
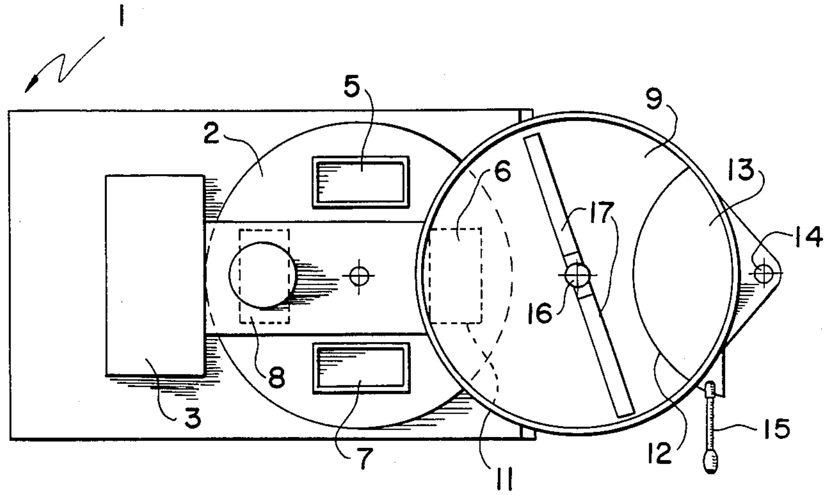
FIG. 2 is a corresponding schematic top plan view.

The machine is mounted upon a base or chassis, generally indicated at 1, upon which is disposed a turntable 2 driven by the motor. In FIGS. 1 and 2, the motor is schematically indicated at 3 while in FIG. 3, motor 4 is a diesel engine, as previously mentioned.

As is best seen in FIG. 2, turntable 2 is provided with four equidistantly spaced moulds 5, 6, 7 and 8, turntable 2 being rotatable through 90° per operating cycle so that each mould is, in turn, presented to a filling station, a holding station, a compressing station and an ejecting station. These will be described more fully below. Positioned above turntable 2 is a mixing chamber 9 superposed on a hopper 10 in the floor of which is provided an aperture 11; which when this aperture 11 is placed in register with an empty mould, the filling station is constituted.

In the floor of the mixing chamber 9, a gate is provided and which is comprised of a cut-away section 12 which co-acts with a covering quadrant 13 pivoted at 14 and operated manually by the handle 15. A rotatable central shaft 16 extends upwardly through hopper 10 and mixing chamber 9, being coupled at the floor of the mixing chamber, this shaft 16 being rotated by the motor. Shaft 16, that is to say, the part in mixing chamber 9, is provided with conventional blades 17, the lowermost one of which acts to transfer mixed raw materials contained in mixing chamber 9 into the hopper 10 when the gate quadrant 13 is swung into the open position.

As will be seen in FIG. 1, the floor of hopper 10 also has a gate comprised of a cut-away section and a co-acting quadrant manually operable by handle 18 in just the same manner as in the case of mixing chamber 9. The purpose of this lower gate arrangement is to enable the inventive machine to be used merely to mix mortar or cement. This lower gate may well be provided with a discharge chute by means of which material may be discharged into a wheelbarrow or the like.

The lower portion of shaft 16, that is to say, that part extending upwardly in hopper 10, has mounted upon it a scraper blade 23 the function of which is to level off the surface of the material in a filled mould prior to rotation of the turntable to the compressing station.

Figure 5:
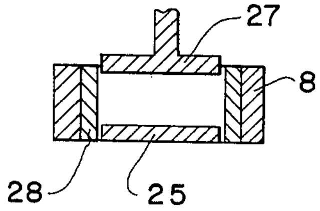
FIG. 5 is a side cross-sectional view of the compressing means of the present invention.

Positioned above turntable 2, opposite to the filling station, is a hydraulic press 19 operated by a pump 20, to be seen in FIG. 3, which press has its ram or piston 27 arranged so as to be operable to compress mixed raw materials, which have been delivered into a mould, to form a masonry product as shown in FIG. 5.

Figure 4:
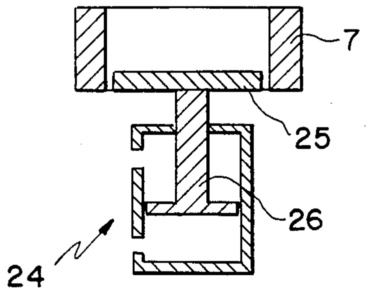
FIG. 4 is a side cross-sectional view of the ejecting means of the present invention.

In each operating cycle, turntable 2 is rotated through 90°. FIG. 2 will illustrate particularly, between the 180° dispositions of the filling and compressing stations is an intermediate holding station represented by mould 5. The choice of four moulds in the turntable is not arbitrary; the holding station of the 4-cycle 360° operation allows the operator a 'breathing space' in which to manually remove a moulded masonry product from a mould presented to an ejecting station represented by mould 7 in FIG. 2. Also operated by the hydraulic pump 20 is the ejecting means 24 in the ejecting station as shown in FIGS. 1 and 4.

Each one of the moulds has an upwardly displaceable floor constituted by a platen 25 which is capable of being acted upon by a ram 26 of the hydraulic ejecting means. The downwardly-acting ram of the hydraulic press 19 also has a similar platen 27 which closely conforms with the dimensions of the moulds.

The two platens may be simple members so that the brick or block compressed between them has planar faces, or they may be configured (see FIG. 7) so that the resulting masonry product has recessed faces 29. Each mold may be fitted with a liner 28 so that profiled bricks or paving blocks can be produced as shown in FIG. 6, and shims can be introduced into the moulds to vary the thickness of the products.

The functioning of the machine may be controlled automatically from a control console referenced 22 in FIG. 3. Operation of this unit results in the automatic mixing of the raw materials, delivery of such to the hopper, discharge of predetermined amounts of the materials to each of the moulds, rotation of the turntable between work stations, and automatic ejection of the pressed masonry products.

There now follows an account of the mode of use of the inventive machine and the method of the invention. It will be readily appreciated that, due to its portability, the machine may be used to manufacture cement stabilized, pressed earth masonry products on site, using raw materials from the site rather than special clays, etc, quarried elsewhere. The firing of the product in a kiln is eliminated and top quality bricks and paving blocks in a variety of shapes, sizes and colours can be produced by unskilled labour.

As in most situations where the characteristics of soil are of consequence, soil on the site must firstly be analysed to determine the mix that is required to form a satisfactory masonry product.

Having established the relevant mix of soil, cement and water, then the soil is required to be sieved to a reasonably homogeneous state and to eliminate impurities such as organic matter and stones. The soil is then placed into the mixer and mixed with a predetermined amount of cement, and, if necessary, water. Once thoroughly mixed, it can be transferred to the hopper where it may be dispensed into the mould and subsequently pressed. Currently it has been found that pressures of approximately 2250 to 2500 pounds per square inch are required to provide a satisfactory masonry element, using locally available soils. After being pressed, the block is retrieved from the mould and cured. Curing involves storage in cool damp conditions for three days prior to being dried for up to four days. The material is then ready for use.

Plasticity of the soil used in the manufacture of blocks in accordance with the present invention is an important factor. Contrary to what may be expected, soil of high plasticity is desirable to facilitate the handling of the product between the mould and the curing area. Resiliency in the product is important during this materials handling stage, as too rigid a product will crack and become unusable.

Further, best results are obtained with a mixture of grain sizes ranging from a clay component of 0.002 mm through silt, fine sand and thick sand up to 2 mm in diameter. In general, the higher proportion of fine gain material used, the higher proportion of cement that is required to stabilize the mix. A soil of up to 85% sand can be used with advantage. Use of soil from the site provides a uniform and attractive colour that is colour fast and is not merely skin deep.

The amount of water required varies from site to site. We have developed a simple test for water requirements by adding water to a mixture until a ball can be moulded in one's hands and dropped from a height of 1 meter to cause it to break. If the ball merely splits into pieces, the water content is satisfactory; however if it does not break and only becomes deformed, perhaps splitting into two or three large components, then humidity is excessive.

In order to determine the quantity of cement to be used, reference is made to the following table in order to make up test bricks for subsequent analysis to determine optimum cement ratios for the soil being used on the particular site.

TEST TABLE FOR CEMENT DOSING

| Mix | Clay | Sandy Soil | Soil | Cement | Volume Cement % |
|---|---|---|---|---|---|
| I | 10% | 90% | 15 Parts | 1 Part | 6.25% |
| II | 20% | 80% | 14 Parts | 1 Part | 6.60% |
| III | 30% | 70% | 13 Parts | 1 Part | 7.10% |
| IV | 40% | 60% | 12 Parts | 1 Part | 7.70% |
| V | 50% | 50% | 11 Parts | 1 Part | 8.30% |
| VI | 60% | 40% | 10 Parts | 1 Part | 9.00% |

After curing under humid conditions for three days and subsequent drying for four days, the masonry elements so derived must be able to survive the following tests:

(a) Immersion in water. The block must be immersible in water for twenty four hours to ensure there is no breakdown of material.

(b) The material must survive a compression test in order to comply with Australian building standards. Now given below are the results of compressive strength tests carried out on blocks manufactured in accordance with the present invention at the Experimental Building Station at North Ryde, New South Wales.

| BRICK No. | DIMENSIONS (mm) Length | Breadth | Depth | COMPRESSIVE STRENGTH (MPa) |
|---|---|---|---|---|
| A1 | 210 | 107 | 50 | 21.5 |
| 2 | 210 | 107 | 53 | 23.2 |
| 3 | 210 | 106 | 52 | 23.9 |
| 4 | 210 | 107 | 52 | 22.3 |
| 5 | 210 | 106 | 52 | 23.4 |
| 6 | 210 | 106 | 52 | 24.0 |
| | Mean | | | 23.0 |
| Characteristic (x − 1.65 S.D.) | | | | 21.4 |
| B1 | 210 | 107 | 53 | 17.7 |
| 2 | 210 | 107 | 53 | 16.5 |
| 3 | 210 | 106 | 53 | 17.2 |
| 4 | 210 | 107 | 55 | 17.7 |
| 5 | 210 | 106 | 50 | 16.4 |
| 6 | 210 | 105 | 54 | 16.1 |
| | Mean | | | 20.0 |
| Characteristic (x − 1.65 S.D.) | | | | 14.6 |

These results met the requirements of EBS Bulletin 5 for pressed earth bricks.

During curing, bricks may be stacked as high as 1.5 meters and then sprayed with water two or three times a day for three humidification curing days. It is important that the bricks be kept humid during this time, prior to drying for four days. It has been found that an improved product is achieved if it has been rehumidified and dried a second time prior to use.

Soil/cement bricks and blocks resulting from the use of our machine may be used conventionally except that the bedding mortar should be as dry as possible. If the mortar is too wet, the brick will absorb water from the mortar.

While we have described our inventive machine and the manufacturing of cement stabilized pressed earth masonry products thereby with reference to the specified embodiment, it will be appreciated that other modifications, may be made without departure from the spirit of the invention.

I claim:

1. A machine for manufacturing masonry products, said machine comprising:

a support;

a turntable rotatably mounted on said support, said turntable having at lease one mold including a cavity therein;

a hopper positioned adjacent and above a first mold filling station of said turntable which includes said mold, said hopper having an aperture registering with said at least one mold cavity when positioned at said first mold filling station for receiving masonry material from said hopper;

a mixing chamber, having an inlet and including a rotatably mounted mixing blade, supported above said hopper, said mixing chamber having a cut-away section in a floor thereof for providing a passageway for masonry material from said mixing chamber into said hopper and a movably mounted gate for controlling and shutting off the flow of material therethrough; and a movable rotatably mounted scraper blade disposed within said hopper for directing masonry material into said at least one mold cavity, and for leveling off the surface of the masonry material of a filled mold prior to passage of the mold to a mold compressing station.

2. The machine according to claim 1, wherein said mixing blade is mounted to a rotatable shaft.

3. The machine according to claim 1, wherein said gate comprises a covering quadrant positioned adjacent said cut-away section in the floor of said mixing chamber, said covering quadrant being pivotably mounted with a handle extending therefrom for manual operation of the gate.

4. The machine according to claim 1, wherein said turntable is provided with four mold cavities equally spaced from the center and around the circumference of the turntable.

5. The machine according to claim 1, wherein said movable scraper blade is mounted on a rotatable shaft.

6. The machine according to claim 5, wherein said rotatable shaft is driven by a motor.

7. The machine according to claim 5, wherein said hopper is a substantially vertically disposed cylinder having a floor with said scraper blade positioned adjacent said floor of said hopper.

8. The machine according to claim 5, wherein said mixing blade is mounted on the same rotatable shaft as said movable scraper blade.

9. The machine according to claim 8, wherein said gate comprises a covering quadrant positioned adjacent said cut-away section in the floor of said mixing chamber, said covering quadrant being pivotably mounted with a handle extending therefrom for manual operation of the gate.

10. The machine according to claim 1, including another gate provided in a floor of said hopper for allowing the machine to be merely used as a mixer for masonry material.

11. The machine according to claim 10, wherein said another gate comprises a covering quadrant positioned adjacent a cut-away section in the floor of said hopper, said covering quadrant being pivotably mounted with a handle extending therefrom for manual operation of the another gate.

12. The machine according to claim 1, wherein a press is positioned above a second compressing station of said turntable for compressing masonry material filled in said mold cavity.

13. The machine according to claim 12, wherein a ram is provided below a third station of said turntable for removing a masonry product from said mold cavity after the masonry material has been previously compressed into the masonry product at said second station.

14. The machine according to claim 13, wherein said ram acts upon a platen disposed at the bottom of said at least one mold cavity, said platen closely conforming with the dimensions of said at least one mold cavity.

15. A machine for the manufacture of masonry products from cement-stabilized earth, said machine comprising:

a chassis;

a turntable mounted for rotation on said chassis and having four molds equidistantly-positioned thereabout;

a motor for rotating said turntable and including means for intermittently angularly displacing said turntable through 90 degrees per operating cycle so that each mold is, in sequence, presented to a filling station, a holding station, a compressing station and an ejecting station;

a mixing chamber, having an inlet and including a rotatably mounted mixing blade, positioned above said turntable for raw materials;

a hopper positioned between said turntable and said mixing chamber which is adapted to receive mixed raw materials from said mixing chamber and to deliver them to each mold in turn, said hopper having an aperture in a floor thereof so that each mold can, in turn, be placed in registry with, and beneath, said aperture, said mixing chamber having a gate in the floor thereof, manually operable for discharge of mixed raw materials into said hopper, said hopper having therein a scrapper blade for levelling of the surface of material in a filled mold prior to rotation of said turntable to said compressing station via said holding station, said scraper blade being mounted for rotation on a central shaft driven by said motor;

a hydraulic press positioned at said compressing station for compressing material in a filled mold to form a masonry product, said press having a downwardly-acting ram carrying a platen which closely conforms with the dimensions of said molds;

ejecting means disposed beneath said ejecting station for facilitating removal of the masonry product from the mold, said ejecting means including an upwardly-acting ram adapted to raise an upwardly-displaceable floor of each mold to thereby eject a compressed masonry product therefrom;

a hydraulic pump, mounted on said chassis for operating said hydraulic press and ejecting means; and control means for rotation of said turntable between work stations, dispensing of raw materials into a said mold, and operation of said hydraulic press and ejecting means;

whereby the provisions of said holding station allows an operator an interval of time in which to remove a compressed masonry product from said turntable.

16. The machine according to claim 15, wherein said hydraulic ram is capable of exerting a pressure of from 2250 to 2500 pounds per square inch on the material contained in a filled mold.

* * * * *